United States Patent
Watanabe

(10) Patent No.: US 10,866,941 B2
(45) Date of Patent: Dec. 15, 2020

(54) COMPUTER AND DATABASE MANAGEMENT METHOD

(71) Applicant: Hitachi, Ltd., Tokyo (JP)

(72) Inventor: Satoru Watanabe, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 467 days.

(21) Appl. No.: 15/552,820

(22) PCT Filed: Mar. 7, 2016

(86) PCT No.: PCT/JP2016/056934
§ 371 (c)(1),
(2) Date: Aug. 23, 2017

(87) PCT Pub. No.: WO2017/154065
PCT Pub. Date: Sep. 14, 2017

(65) Prior Publication Data
US 2018/0173736 A1 Jun. 21, 2018

(51) Int. Cl.
*G06F 7/00* (2006.01)
*G06F 16/22* (2019.01)

(52) U.S. Cl.
CPC ........ *G06F 16/221* (2019.01); *G06F 16/2272* (2019.01); *G06F 16/2282* (2019.01)

(58) Field of Classification Search
CPC . G06F 16/2282; G06F 16/221; G06F 16/2272
(Continued)

(56) References Cited

U.S. PATENT DOCUMENTS

| 6,947,944 B1 | 9/2005 | Furuike |
| 8,631,000 B2 | 1/2014 | Franke et al. |

(Continued)

FOREIGN PATENT DOCUMENTS

| JP | 2000-305822 A | 11/2000 |
| JP | 2005-352561 A | 12/2005 |

(Continued)

OTHER PUBLICATIONS

Japanese-language International Search Report (PCT/ISA/210) issued in PCT Application No. PCT/JP2016/056934 dated May 31, 2016 (3 pages).

(Continued)

*Primary Examiner* — Md I Uddin
(74) *Attorney, Agent, or Firm* — Crowell & Moring LLP

(57) ABSTRACT

In a system in which a database process among processes of a computer is offloaded to one or more hardware circuits each having a memory, the computer divides a column store database made up of a plurality of records and a plurality of columns into a plurality of data segments. One or more columns among the plurality of columns are each one or more compression target columns. Each of the plurality of data segments includes: a column store database portion made up of one or more records among the plurality of records; and a compression dictionary which is a dictionary for decompressing one or more compression target column portions within the column store database portion. The size of the compression dictionary in each of the plurality of data segments is equal to or smaller than the size of the memory.

9 Claims, 10 Drawing Sheets

(58) Field of Classification Search
USPC .......................... 707/693, 713, 719, 999.104
See application file for complete search history.

(56) References Cited

U.S. PATENT DOCUMENTS

| | | |
|---|---|---|
| 2007/0277036 A1 | 11/2007 | Chamberlain et al. |
| 2011/0285556 A1* | 11/2011 | Nov .................. H03M 7/30 |
| | | 341/51 |
| 2015/0178305 A1* | 6/2015 | Mueller ............. G06F 16/221 |
| | | 707/693 |
| 2017/0017395 A1 | 1/2017 | Kurokawa et al. |

FOREIGN PATENT DOCUMENTS

| | | |
|---|---|---|
| JP | 2007-524923 A | 8/2007 |
| JP | 2010-26884 A | 2/2010 |
| WO | WO 2015/145647 A1 | 10/2015 |

OTHER PUBLICATIONS

Japanese-language Written Opinion (PCT/ISA/220 and PCT/ISA/237) issued in PCT Application No. PCT/JP2016/056934 dated May 31, 2016 (5 pages).

* cited by examiner

FIG. 3

DB table definition management size table
135

| 401 | 402 | 403 |
| --- | --- | --- |
| Column ID | Column name | Data type |
| 1 | L_ORDERKEY | INTEGER |
| 2 | L_SUPPKEY | INTEGER |
| 3 | L_LINENUMBER | INTEGER |
| 4 | L_EXTENEDPRICE | INTEGER |
| 5 | L_LINESTATUS | CHAR(1) |
| 6 | L_SHIPMODE | CHAR(25) |

FIG. 5

Segment configuration management information
410

| Column ID | Column offset | Dictionary offset |
|---|---|---|
| 1 | 500 | 0 |
| 2 | 600 | 50 |
| 3 | 700 | NULL |
| 4 | 800 | 100 |
| 5 | 900 | NULL |
| 6 | 1000 | 130 |

601 — Column ID
602 — Column offset
603 — Dictionary offset

FIG. 6

Sub-compression dictionary
421

| Compression value (701) | Decompression value (702) |
|---|---|
| 0 | 100 |
| 1 | 150 |
| 2 | 200 |
| 3 | 300 |
| 4 | 400 |
| 5 | 125 |

FIG. 7

```
SELECT
    SUM(L_EXTENDEDPRICE), L_LINESTATUS
FROM
    LINEITEM
WHERE
    L_PARTKEY > 5000
GROUP BY
    L_LINESTATUS;
```

FIG. 8

| | |
|---|---|
| SSD_ID | 801 |
| Starting logical address | 802 |
| Ending logical address | 803 |
| Result storage server memory address | 804 |
| DB process content | 805 |

FIG. 11

```
1|46556804|2306820|1|17|31594.16|0.04|0.02|N|O|1996-03-13|1996-02-12|1996-03-22|DELIVER IN PERSON|TRUCK|blithely regular ideas caj
1|20192724|2192725|2|36|65365.92|0.09|0.06|N|O|1996-04-12|1996-02-28|1996-04-20|TAKE BACK RETURN|MAIL|slyly bold pinto beans detect s
1|19109933|1109934|3|8|15535.84|0.10|0.02|N|O|1996-01-29|1996-03-05|1996-01-31|TAKE BACK RETURN|REG AIR|deposits wake furiously
1|63944491|389450|4|28|38875.48|0.09|0.06|N|O|1996-04-21|1996-03-30|1996-05-16|NONE|AIR|even ideas haggle. even, bold reque
1|7207991|457998|5|24|45567.12|0.10|0.04|N|O|1996-03-30|1996-03-14|1996-04-01|NONE|FOB|carefully final gr
1|4690335|190338|6|32|42403.20|0.07|0.02|N|O|1996-01-30|1996-02-07|1996-02-03|DELIVER IN PERSON|MAIL|furiously regular accounts haggle
```

COMPUTER AND DATABASE MANAGEMENT METHOD

TECHNICAL FIELD

The present invention generally relates to data management technology.

BACKGROUND ART

Technology of offloading a partial portion of a process of a computer to a hardware circuit is known. For example, PTL 1 discloses a system which performs processes of a database using an FPGA (Field-Programmable Gate Array).

A column store database (a column store-type database) is also known. For example, PTL 2 discloses a method for controlling a column store database.

CITATION LIST

Patent Literature

[PTL 1]
Japanese Translation of PCT Application No. 2007-524923
[PTL 2]
U.S. Pat. No. 8,631,000 (Specification)

SUMMARY OF INVENTION

Technical Problem

An advantage of the column store database is that compression efficiency is high since the frequency that the same value (column value) appears in one column is higher than that of a row store database (a row store-type database).

According to the technology disclosed in PTL 1 and 2, a partial portion of a process associated with a column store database may be offloaded to an FPGA.

However, the volume of an internal memory (for example, an SRAM) of the FPGA is generally small. In a process (typically, a search process) of a column store database, although a compression dictionary which is a dictionary for decompressing respective columns is used, a compression dictionary does not fall within an internal memory of the FPGA. A portion of the compression dictionary is stored in an external memory (for example, a DRAM) of the FPGA or a nonvolatile storage device that can communicate with the FPGA. Due to this, the FPGA has to access the external memory or the nonvolatile storage device to refer to the compression dictionary. As a result, a processing performance decreases.

A similar problem can occur when a hardware circuit other than the FPGA is used.

Solution to Problem

In a system in which a database process among processes of a computer is offloaded to one or more hardware circuits each having a memory, the computer divides a column store database made up of a plurality of records and a plurality of columns into a plurality of data segments. One or more columns among the plurality of columns are each one or more compression target columns. Each of the plurality of data segments includes: a column store database portion made up of one or more records among the plurality of records; and a compression dictionary which is a dictionary for decompressing one or more compression target column portions within the column store database portion. The size of the compression dictionary in each of the plurality of data segments is equal to or smaller than the size of the memory.

The "computer" may be one or more physical computers and may include at least one virtual computer.

Advantageous Effects of Invention

In a database process on a data segment, an entire compression dictionary in the data segment falls within a memory of a hardware circuit that performs the database process. Due to this, it is possible to avoid a decrease in performance of a column store database process.

BRIEF DESCRIPTION OF DRAWINGS

FIG. 3 illustrates a configuration example of a DB table definition management table.

FIG. 5 illustrates a configuration example of segment configuration management information.

FIG. 6 illustrates a configuration example of a sub-compression dictionary.

FIG. 7 illustrates an example of a query.

FIG. 8 illustrates a configuration example of a command created by a command creation unit.

FIG. 11 illustrates a configuration example of an input file input to a data loading unit.

DESCRIPTION OF EMBODIMENTS

Figure 1:
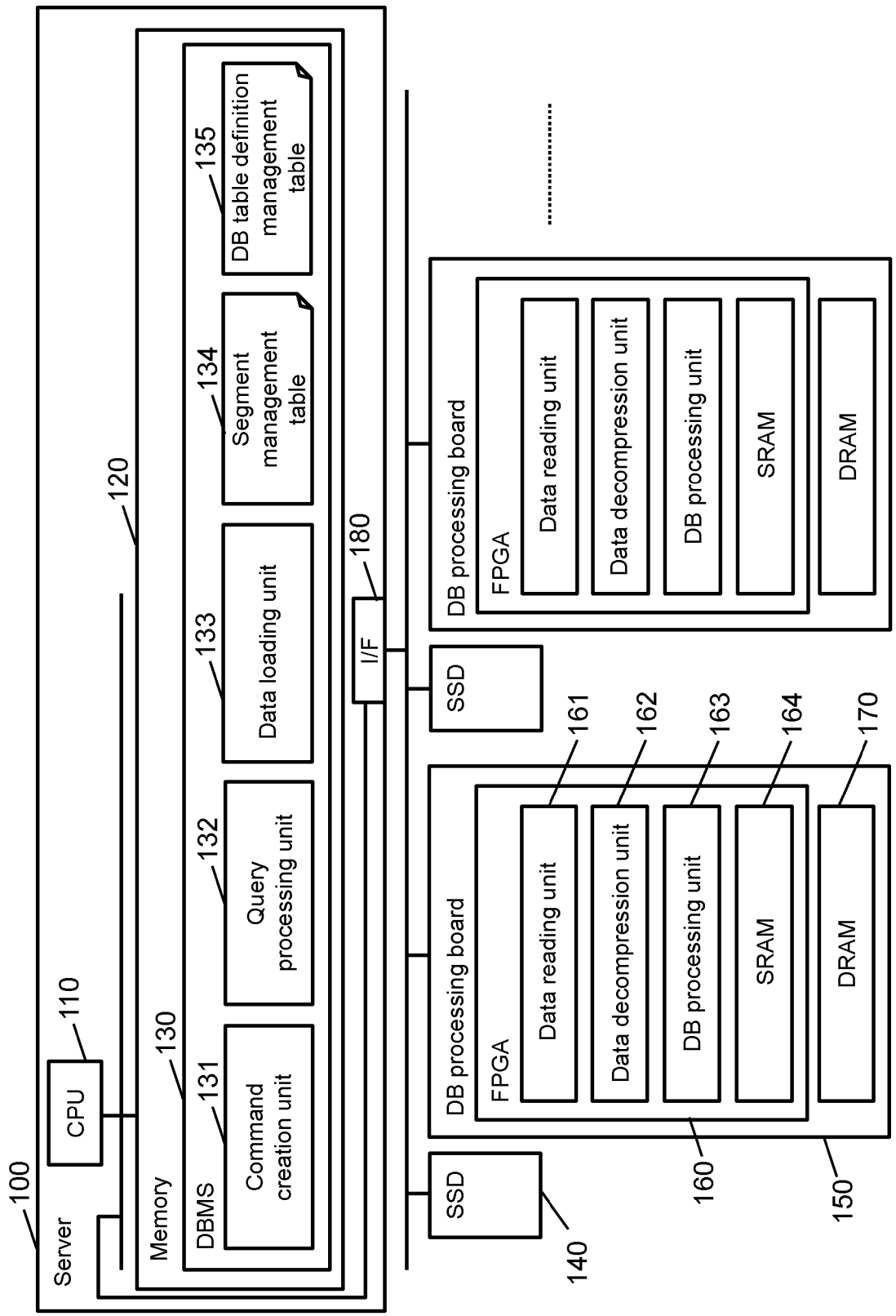
FIG. 1 illustrates a configuration example of a computer system according to an embodiment.

Hereinafter, an embodiment of the present invention will be described with reference to the drawings. However, the present embodiment is an example for implementing the present invention and does not limit the technical scope of the present invention.

In the following description, an "interface unit" includes one or more interfaces. One or more interfaces may be one or more interface devices of the same type (for example, one or more NICs (network interface cards)) and may be two or more interface devices of different types (for example, a NIC and a HBA (host bus adapter)).

In the following description, a "storage resource" includes one or more memories. At least one memory may be a volatile memory or nonvolatile memory. The storage resource may include one or more PDEVs in addition to one or more memories. The "PDEV" means a physical storage device and typically may be a nonvolatile storage device (for example, an auxiliary storage device). The PDEV may be an HDD (Hard Disk Drive) or an SSD (Solid State Drive), for example.

In the following description, a "processor unit" includes one or more processors. At least one processor is typically a CPU (Central Processing Unit). The processor may include a hardware circuit that performs a partial portion or an entire portion of processes.

In the following description, although a processing unit (a function) is sometimes described using an example of a "kkk unit," the processing unit may be implemented when a computer program is executed by a processor unit and may be implemented by a hardware circuit (for example, an FPGA or an ASIC (Application Specific Integrated Circuit)). When the processing unit is implemented by a processor unit executing a program, since a predetermined process is performed using a storage resource (for example, a memory) and/or a communication interface device (for example, a communication port) and the like appropriately, the processing unit may be at least a portion of the processor unit. A process described using the processing unit as a subject may be a process performed by a processor unit or an apparatus having the processor unit. Moreover, the processor unit may include a hardware circuit that performs a partial portion or an entire portion of the process. The program may be installed from a program source to a processor. The program source may be a recording medium (for example, a non-transitory recording medium) readable by a computer or a program distribution computer. The description of each processing unit is an example, a plurality of processing units may be integrated into one processing unit, and one processing unit may be divided into a plurality of processing units.

In the following description, although information is sometimes described using an expression of an "xxx management table," the information may be expressed by an arbitrary data structure. That is, the "xxx management table" may be referred to as "xxx management information" in order to show that information does not depend on a data structure. Moreover, in the following description, the configuration of each table is an example, one table may be divided into two or more tables, and all or a portion of two or more tables may be integrated into one table.

In the following description, a "database" is abbreviated as a "DB". Moreover, a table as a DB will be referred to as a "DB table".

FIG. 1 illustrates a configuration example of a computer system according to an embodiment.

A computer system includes a plurality of (or one) SSDs (Solid State Drives) 140, a plurality of (or one) DB processing boards 150, and a server 100. Each SSD 140 is an example of a nonvolatile storage device. Each DB processing board 150 is an example of a hardware circuit. Each DB processing board 150 includes an FPGA 160 including an SRAM (Static Random Access Memory) 164 and a DRAM (Dynamic Random Access Memory) 170. The SRAM 164 is an example of an internal memory. The internal memory is an example of a first memory. The DRAM 170 is an example of an external memory. The external memory is an example of a second memory (a memory slower than the first memory). The speed of a memory depends on whether the memory is in the FPGA 160 or the type of the memory. The server 100 is an example of a computer. The server 100 includes an I/F 180, a memory 120, and a CPU 110 coupled to these elements. The I/F 180 is an example of an interface unit. The memory 120 is an example of a storage resource. The CPU 110 is an example of a processor unit. A DBMS (Database Management System) 130 executed by the CPU 110 is stored in the memory 120. The DBMS 130 includes a command creation unit 131, a query processing unit 132, and a data loading unit 133 and manages a segment management table 134 and a DB table definition management table 135.

An outline of the present embodiment will be described later.

The data loading unit 133 divides a DB table (a column store database) made up of M records and N columns into a plurality of data segments and stores the plurality of data segments in the plurality of SSDs 140. M and N are integers of 2 or more. M and N may be the same values and may be different values. One or more columns among N columns are one or more compression target columns. Each of the plurality of data segments includes a DB table portion and a compression dictionary which is a dictionary for decompressing one or more compression target column portions within the DB table portion. In each of the plurality of data segments, the size of the compression dictionary is equal to or smaller than the size of the SRAM 164. Due to this, when the FPGA 160 performs a DB process on a data segment, the entire compression dictionary in the data segment always falls within the SRAM 164 in the FPGA 160. Therefore, it is possible to avoid a decrease in a processing performance.

The DB table is divided in the following manner. The data loading unit 133 calculates a dictionary size of the compression dictionary on the basis of the number of unique column values in each of one or more compression target column portions of the DB table portion that form m records (m is a natural number smaller than M). When the calculated dictionary size exceeds the size of the SRAM 164, the data loading unit 133 creates a compression dictionary corresponding to a DB table portion made up of (m−x) records (x is a natural number smaller than m). As a result, the dictionary size of the created compression dictionary becomes equal to or smaller than the size of the SRAM 164.

When a query is received from a query source (not illustrated), the query processing unit 132 calls the command creation unit 131. The command creation unit 131 creates a command for each of one or more data segments corresponding to the query on the basis of the query. That is, one command is a command for a DB process on one data segment. Therefore, the DB process is performed on a data segment, and as described above, the entire compression dictionary in the data segment falls within the SRAM 164 in the FPGA 160 that executes the DB process. Due to this, it is possible to avoid a decrease in a processing performance. The query processing unit 132 transmits one or more commands corresponding to one or more data segments to one or more FPGAs 160 (one or more DB processing boards 150). The query processing unit 132 receives the results of one or more DB processes corresponding to one or more commands from one or more FPGAs 160. The query processing unit 132 creates a query execution result by summarizing the received one or more DB process results. The query processing unit 132 returns the created execution result to the query source. By transmitting a plurality of commands based on one query to the plurality of FPGAs 160, a plurality of DB processes can be executed in parallel by the plurality of FPGAs 160. Therefore, it is possible to process the query at a high speed and to efficiently use the plurality of FPGAs 160. The query source may be an application program (not illustrated) executed by the server 100 and may be a client (not illustrated) coupled to the server 100.

Hereinafter, the present embodiment will be described in detail. In the following description, it is assumed that N=6, that is, the number of columns included in a DB table is 6.

As described above, each of the plurality of SSDs 140 is an example of a nonvolatile storage device. A nonvolatile storage device (for example, an HDD (Hard Disk Drive)) of a different type may be used instead of at least one of the plurality of SSDs 140. A plurality of data segments based on the DB table (a column store database) are stored in the plurality of SSDs 140.

The DB processing board 150 is a type of accelerator. As described above, the DB processing board 150 includes the FPGA 160 and the DRAM 170. The FPGA 160 includes the SRAM 164. The SRAM 164 in the FPGA 160 is disposed in the FPGA 160 and is faster than the DRAM 170 outside the FPGA 160. The FPGA 160 includes a data reading unit 161, a data decompression unit 162, and a DB processing unit 163. The data reading unit 161 reads a data segment from the SSD 140 and stores the compression dictionary in the data segment in the SRAM 164. The data decompression unit 162 decompresses a compression column portion (a decompressed column portion) in the data segment by referring to the compression dictionary in the SRAM 164. The DB processing unit 163 executes a DB process using the decompressed column portion.

As described above, the DBMS 130 is executed by the CPU 110 of the server 100. The DBMS 130 is an example of a computer program. As described above, the DBMS 130 includes the command creation unit 131, the query processing unit 132, and the data loading unit 133 and manages the segment management table 134 and the DB table definition management table 135. The command creation unit 131 creates one commands for one data segment. The query processing unit 132 processes a query received from a query source. The data loading unit 133 stores a plurality of data segments including the DB table (the column store database) in the plurality of SSDs 140. The segment management table 134 retains information (for example, storage destination information (for example, an ID and a logical address of the SSD 140) of each data segment) on each of the plurality of data segments based on the DB table. The DB table definition management table 135 retains information on a DB table definition.

Figure 2:
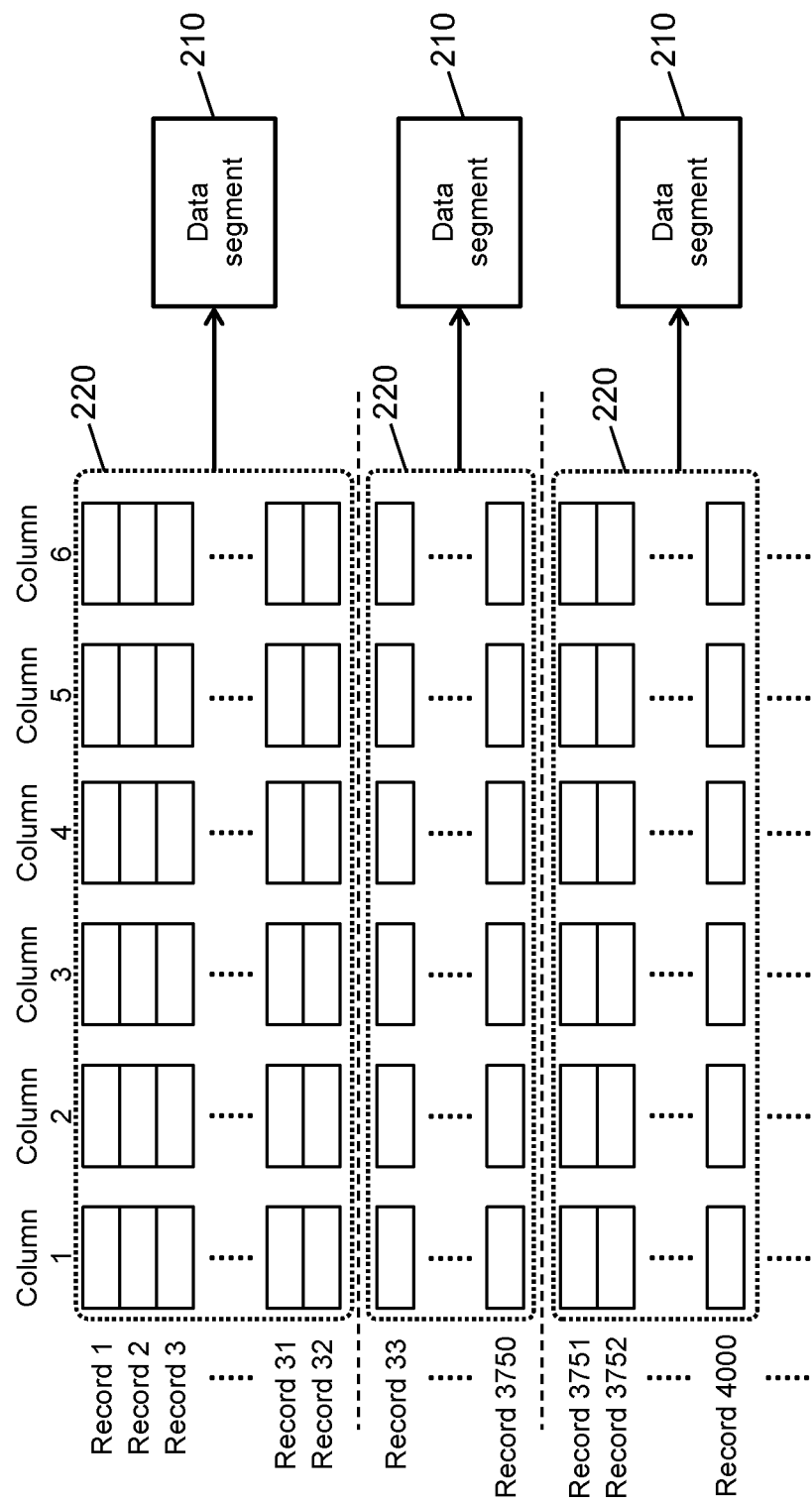
FIG. 2 illustrates an example of a correspondence between a DB table (a column store database) and a data segment.

FIG. 2 illustrates an example of a correspondence between a DB table (a column store database) and a data segment.

Although the DB table is divided into a plurality of data segments 210, each data segment 210 includes a DB table portion 220 and a compression dictionary (not illustrated in FIG. 2). For example, as illustrated in FIG. 2, when a DB table is made up of 4000 or more records, a first DB table portion 220 includes six column portions made up of records 1 to 32. In each data segment 210, the six column portions include at least one compression column portion. The "compression column portion" is a compressed column portion. A compression target column portion is compressed and is included in the data segment 210. The "column portion" is a portion of a column.

In one data segment 210, the number of records that form the six column portions depends on the number of unique column values in each of the six column portions. This is because at least one column portion is a compression target. In one column portion, the "unique column value" is a column value that is unique in the column portion.

FIG. 3 illustrates a configuration example of the DB table definition management table 135.

The DB table definition management table 135 has an entry for each of columns included in the DB table. Each entry retains information including a column ID 401, a column name 402, and a data type 403. The column ID 401 indicates the ID of a column. The column name 402 indicates the name of a column. The data type 403 indicates a data type of a column.

Figure 4:
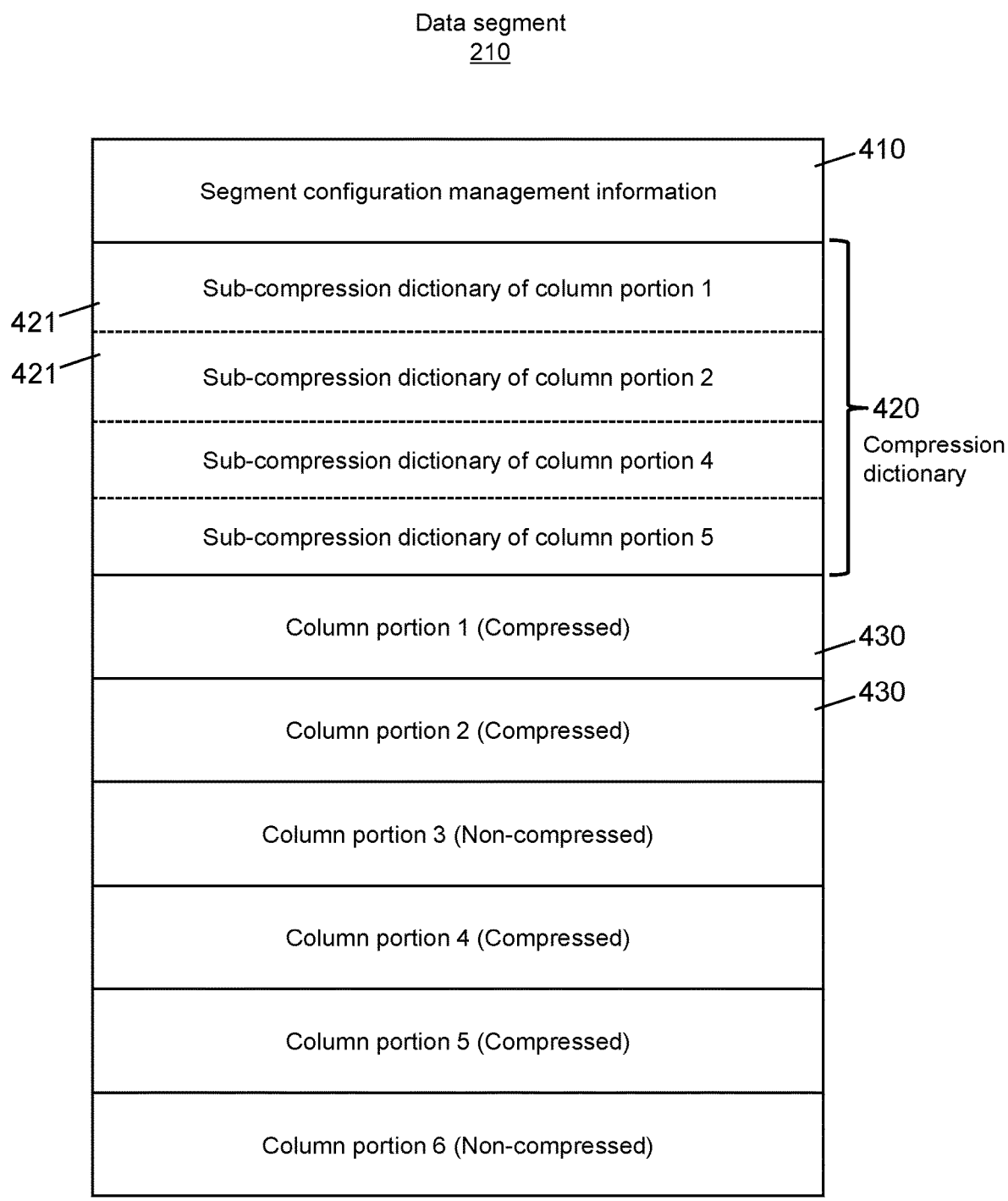
FIG. 4 illustrates a configuration example of a data segment.

FIG. 4 illustrates a configuration example of the data segment 210. A "column portion n" means a column portion of a column n (n is any one of the integers 1 to 6). The "column n" is a column corresponding to the column ID "n".

The data segment 210 includes segment configuration management information 410, a compression dictionary 420, and six column portions 430. The six column portions 430 include one or more compression column portions 430. The compression dictionary 420 is made up of one or more sub-compression dictionaries 420 corresponding to one or more compression column portions 430.

According to the example illustrated in FIG. 4, since compressed column portions among the column portions 1 to 6 are column portions 1, 2, 4, and 5, the compression dictionary 420 includes four sub-compression dictionaries 421 corresponding to the column portions 1, 2, 4, and 5.

FIG. 5 illustrates a configuration example of the segment configuration management information 410.

The segment configuration management information 410 is a table that retains information on a configuration of the data segment 210 that includes this table. The segment configuration management information 410 has an entry for each of the column portions 430. Each entry retains information including a column ID 601, a column offset 602, and a dictionary offset 603.

The column ID 601 indicates the ID of a column that includes the column portion 430. The column offset indicates an offset (a difference from the start of the data segment 210 to the start of the column portion 430) of the column portion 430 (that is, the position of the column portion 430 in the data segment 210). The dictionary offset indicates an offset (a difference from the start of the data segment 210 to the start of the sub-compression dictionary 421) of the sub-compression dictionary 421 corresponding to the column portion 430 (that is, the position of the sub-compression dictionary 421 in the data segment 210). The column portion 430 of which the dictionary offset has a valid value (for example, a value other than "NULL") is a compressed column portion 430. The column portion 430 of which the dictionary offset has an invalid value (for example, "NULL") is a non-compression column portion 430.

FIG. 6 illustrates a configuration example of the sub-compression dictionary 421.

The sub-compression dictionary 421 indicates a relation between a compression value 701 and a decompression value 702 for the compression column portion 430 corresponding to this sub-compression dictionary 421. The compression value 701 is a column value after compression. The decompression value 702 is a column value after decompression.

As described above, one command is created for one data segment 210 on the basis of a query.

FIG. 7 illustrates an example of a query.

A query is described, for example, by a SQL (Structured Query Language). For example, a SELECT statement is described in the query.

FIG. 8 illustrates a configuration example of a command created by the command creation unit 131.

The command includes an SSD_ID 801, a starting logical address 802, an ending logical address 803, a result storage server memory address 804, and a DB process content.

The SSD_ID 801 indicates the ID of an SSD 140 in which a target data segment 210 (the data segment 210 corresponding to this command) is stored. The starting logical address 802 indicates a starting logical address (the logical address in the SSD 140) of the target data segment 210. The ending logical address 803 indicates an ending logical address (the logical address in the SSD 140) of the target data segment 210. The result storage server memory address 804 indicates a storage destination address (an address of an area in the memory 120) of the DB process result. The DB process content 805 indicates the content of a DB process performed on a DB table portion in the target data segment 210. The DB process content 805 includes at least one of a data search condition, a search condition combination method, and a data extraction condition, for example.

Figure 9:
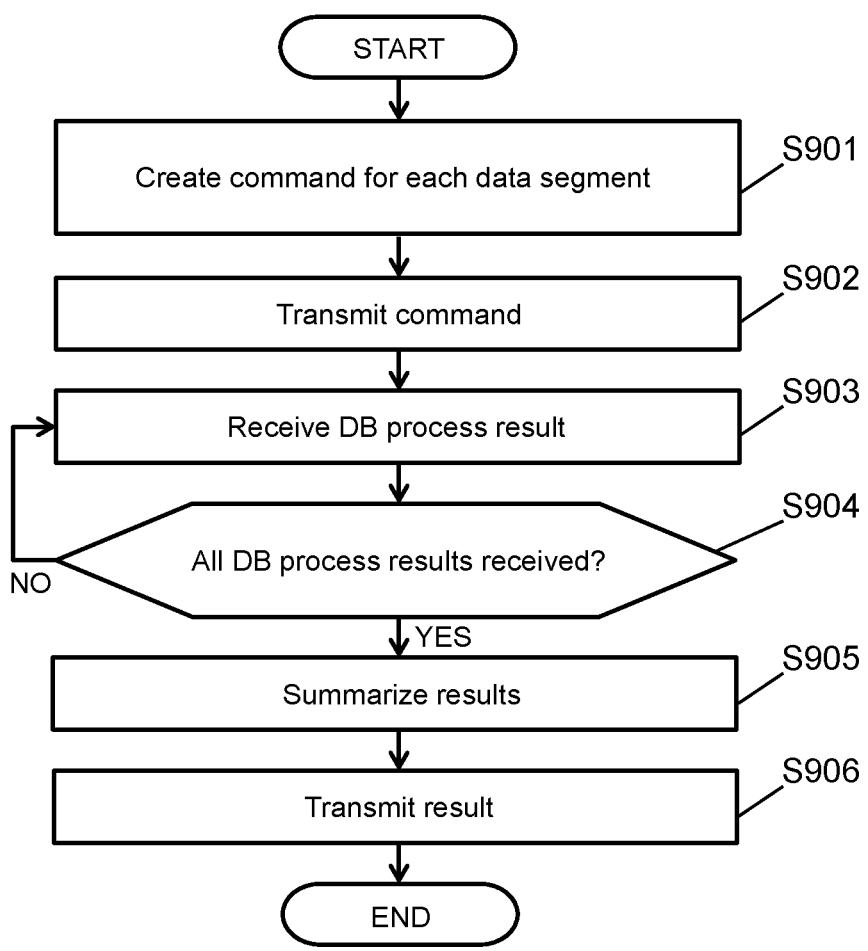
FIG. 9 illustrates a flowchart illustrating an example of the flow of a query process.

FIG. 9 is a flowchart illustrating an example of the flow of a query process. The query process starts when the query processing unit 132 receives a query from a query source. Hereinafter, it is assumed that the query is a search query. Moreover, it is assumed that a DB process is executed on the DB table portions of all data segments 210 according to the search query.

The query processing unit 132 calls the command creation unit 131, and the command creation unit 131 creates a command for each of the plurality of data segments 210 corresponding to the query on the basis of this query (S901). That is, one command is a command for a DB process on one data segment 210.

The query processing unit 132 transmits the plurality of created commands to the plurality of FPGAs 160 (the plurality of DB processing boards 150) (S902). The FPGA 160 having received the command performs the following process, for example. The data reading unit 161 reads the data segment 210 corresponding to the command from the SSD 140 (a read source indicating by the SSD_ID 801, the starting logical address 802, and the ending logical address 803 described in the command). The data reading unit 161 stores the compression dictionary 420 in the data segment 210 in the SRAM 164. The data decompression unit 162 decompresses the compression column portion 430 of the DB table portion in the data segment 210 by referring to the compression dictionary 420 in the SRAM 164 and stores the DB table portion in the data segment 210 in the DRAM 170. Due to the reasons to be described later, the entire DB table portion (including the decompressed column portion) falls within the DRAM 170 (or a portion of the SRAM 164 and the DRAM 170). The DB processing unit 163 executes a DB process on the DB table portion of the DB processing board 150 according to the DB process content 805 in the command. The DB processing unit 163 returns the DB process result. Specifically, the DB processing unit 163 stores the DB process result in an area (an area in the memory 120 of the server 100) indicated by the result storage server memory address 804 according to DMA (Direct Memory Access).

The server 100 receives the DB process result from the FPGA 160 for each of the plurality of transmitted commands in S902 (S903). Specifically, the DB process result for each command is stored in an area indicated by the result storage server memory address 804 in the command. When the DB process result is received for all commands (S904: YES), the query processing unit 132 summarizes a plurality of DB process results corresponding to the plurality of commands (S905) to create a query execution result. The query processing unit 132 returns the created execution result to the query source (S906).

By transmitting a plurality of commands based on one query to a plurality of FPGAs 160, a plurality of DB processes can be executed in parallel by the plurality of FPGAs 160. Therefore, it is possible to process the query at a high speed and to efficiently use the plurality of FPGAs 160. Moreover, as described above, since the entire DB table portion obtained from the data segment 210 falls within the DRAM 170 (or a portion of the SRAM 164 and the DRAM 170), it is possible to further accelerate processing.

Figure 10:
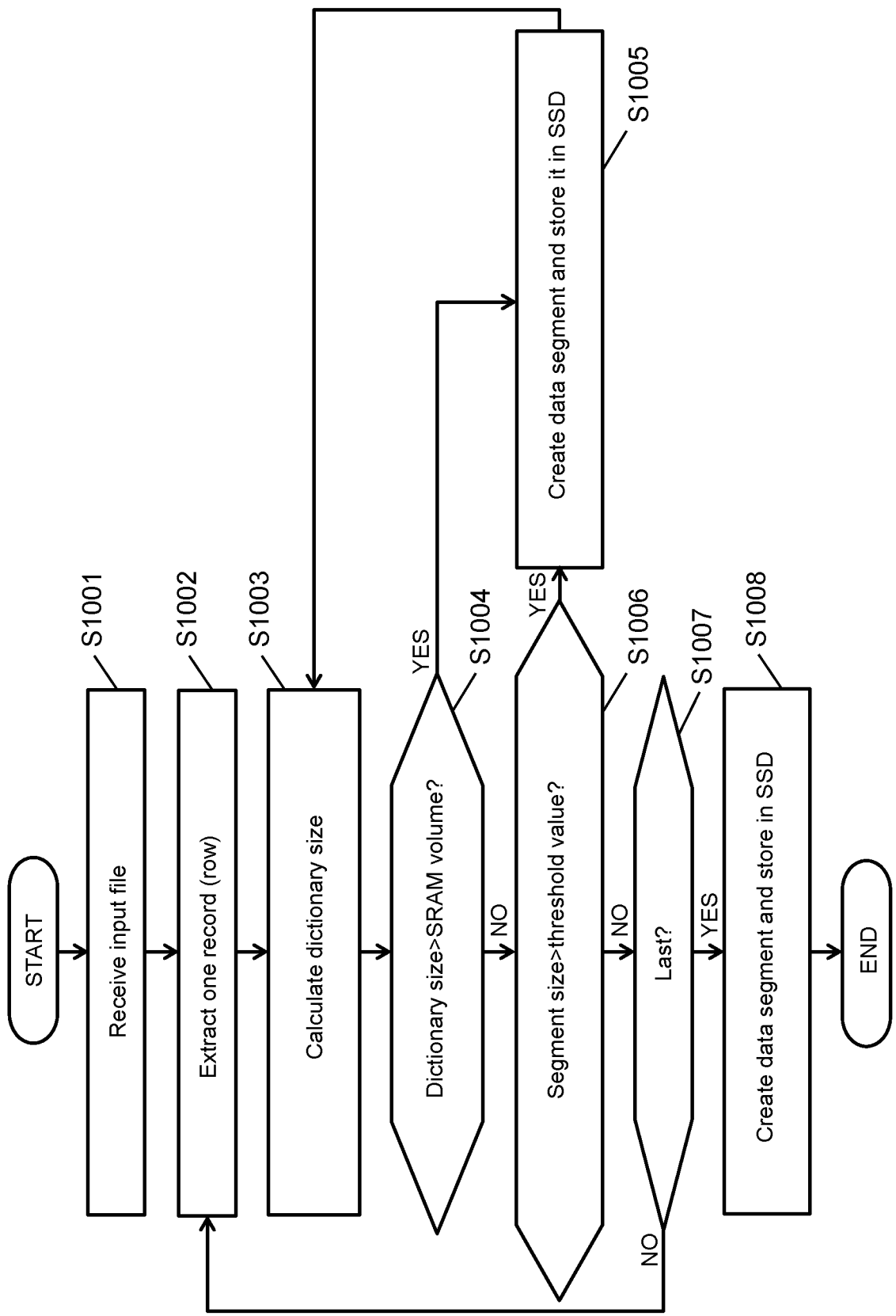
FIG. 10 is a flowchart illustrating an example of the flow of a data loading process.

FIG. 10 is a flowchart illustrating an example of the flow of a data loading process.

The data loading unit 133 receives an input file (S1001). The input file is the file of a DB table. FIG. 11 illustrates an example of a configuration example of an input file.

The data loading unit 133 extracts one record (row) from non-extracted records among M records indicated by the input file (S1002). Records which are not included in the data segment 210 extracted in S1002 are referred to as "candidate records".

The data loading unit 133 calculates the size of the compression dictionary 420 corresponding to the DB table portion made up of m candidate records (m is a natural number equal to or smaller than M) on the basis of the number of unique column values in each compression target column portion among the six column portions 430 formed by the m candidate records (S1003). Specifically, for example, the data loading unit 133 calculates the size of the sub-compression dictionary 421 on the basis of the number of unique column values with respect to each compression target column portion 430. The data loading unit 133 calculates the size of the compression dictionary 420 by calculating the sum of the sizes of all sub-compression dictionaries 421.

The data loading unit 133 determines whether the calculated size exceeds the size of the SRAM 164 (S1004). The size of the SRAM 164 may be notified from the FPGA 160 to the DBMS 130 in response to an inquiry from the DBMS 130 during the data loading process and may be understood in advance by the DBMS 130.

When the determination result in S1004 is true (S1004: YES), the data loading unit 133 creates the data segment 210 including a DB table portion made up of (m−x) candidate records (x is a natural number smaller than m) and the compression dictionary 420 corresponding to the DB table portion and stores the created data segment 210 in an arbitrary SSD 140 (S1005). That is, in S1005, the segment configuration management information 410, the compression dictionary 420, and the compression column portion 430 included in the data segment 210 are created. The reason why subtracting x is to control the dictionary size to be equal to or smaller than the size of the SRAM. The value x may be a variable value and may be determined on the basis of the number of unique column values in the compression target column portion 430. After S1005 is performed, S1003 is executed for x candidate records which are not included in the data segment 210 in S1005.

When the determination result in S1004 is false (S1004: NO), the data loading unit 133 determines whether the size of the data segment 210 including a DB table portion made up of m candidate records and the compression dictionary 420 corresponding to the DB table portion exceeds a threshold value (a predetermined segment size) (S1006). The threshold value is a value for controlling the size of the DB table portion to be equal to or smaller than the predetermined size in each of the plurality of data segments 210. The predetermined size is the sum (p) of the DRAM size and the difference between the SRAM size and the compression dictionary size or the DRAM size (q). That is, the threshold value (a predetermined segment size) is determined such that the entire DB table portion obtained from the data segment 210 falls within a storage area of the DB processing board 150.

When the determination result in S1006 is true (S1006: YES), the data loading unit 133 creates the data segment 210 including a DB table portion made up of m candidate records and the compression dictionary 420 corresponding to the DB table portion and stores the data segment 210 in an arbitrary SSD 140 (S1005). That is, even when the compression dictionary size is smaller than the SRAM size (that is, even when the number of candidate records increases and the compression dictionary size can become equal to or smaller than the SRAM size), the data segment 210 is created and stored in the SSD 140.

The data loading unit 133 determines whether a record read in S1002 is the last record among the M records indicated by the input file (S1007). When the determination result in S1007 is false (S1007: NO), the flow returns to S1002.

When the determination result in S1007 is true (S1007: YES), the data loading unit 133 creates the data segment 210 including a DB table portion made up of all candidate records and the compression dictionary 420 corresponding to the DB table portion and stores the data segment 210 in an arbitrary SSD 140.

While an embodiment has been described, the present invention is not limited to the above-described embodiment and can be applied to various other embodiments. For example, the size of the DB table portion may exceed the size of the DRAM 170. In this case, a portion of the DB table portion may be stored in the SSD 140.

REFERENCE SIGNS LIST

100 Server

The invention claimed is:

1. A computer comprising:
    an interface unit which is one or more interfaces coupled to one or more hardware circuits each having a first memory; and
    a processor unit which is one or more processors coupled to the interface unit, wherein
    the processor unit is configured to divide a column store database made up of a plurality of records and a plurality of columns into a plurality of data segments,
    each of the one or more hardware circuits is a circuit that executes a database process corresponding to a command from the processor unit,
    one or more columns among the plurality of columns are each one or more compression target columns,
    each of the plurality of data segments includes
        a column store database portion made up of one or more records among the plurality of records; and
        a compression dictionary which is a dictionary for decompressing one or more compression target column portions within the column store database portion, and
    the size of the compression dictionary in each of the plurality of data segments is equal to or smaller than the size of the first memory,
    each of the one or more hardware circuits further includes a second memory slower than the first memory,
    in at least one of the plurality of data segments, the size of the column store database portion is equal to or smaller than a predetermined size, and
    the predetermined size
        is a sum of the size of the second memory and a difference between the size of the first memory and the size of the compression dictionary, or
        is the size of the second memory,
    wherein the processor unit is configured to create the plurality of data segments by repeatedly executing:
        (A) calculating, on the basis of the number of unique column values in each of one or more compression target column portions of a column store database portion that forms the m records in the column store database, the size of a compression dictionary corresponding to the column store database portion made up of m records (m is a natural number); and
        (B) determining whether or not to create a data segment on the basis of a result of comparison between the calculated size and the size of the first memory.

2. The computer according to claim 1, wherein
in (B), the processor unit is configured to
    (b1) determine whether the calculated size for the m records exceeds the size of the first memory; and
    (b2) create a data segment including a column store database portion made up of (m−x) records (x is a natural number smaller than m) and a compression dictionary corresponding to the column store database portion when a determination result in (Ill) is true.

3. The computer according to claim 2, wherein
the processor unit is configured to
    (b3) determine whether the size of a data segment including a column store database portion made up of the m records and a compression dictionary corresponding to the column store database portion exceeds a predetermined segment size when the determination result in (b1) is false; and
    (b4) create a data segment including the column store database portion made up of the m records and the compression dictionary corresponding to the column store database portion when a determination result in (b3) is true.

4. The computer according to claim 3, wherein
each of the one or more hardware circuits is a circuit that includes an external memory and an FPGA (field-programmable gate array) including an internal memory,
the internal memory is the first memory, and
the external memory is the second memory.

5. The computer according to claim 1, wherein
the processor unit is configured to
    create a command on the basis of a query received from a query source, for each of one or more data segments corresponding to the query;
    transmit one or more commands corresponding to the one or more data segments to the one or more hardware circuits;
    receive one or more database process results corresponding to the one or more commands, from the one or more hardware circuits; and
    return a result based on the received one or more database process results, to the query source as a response to the query.

6. The computer according to claim 5, wherein
the query is a search query,
the one or more commands are a plurality of commands corresponding to the plurality of data segments, and
the one or more hardware circuits are a plurality of hardware circuits.

7. The computer according to claim 1, wherein
each of the one or more hardware circuits is a circuit that includes an external memory and an FPGA (field-programmable gate array) including an internal memory, and the internal memory is the first memory.

8. A database management method in a system in which a database process among processes of a computer is offloaded to one or more hardware circuits each having a first memory, the method comprising:
inputting a column store database made up of a plurality of records and a plurality of columns; and
dividing the input column store database into a plurality of data segments, wherein
one or more columns among the plurality of columns are each one or more compression target columns,
each of the plurality of data segments includes
a column store database portion made up of one or more records among the plurality of records; and
a compression dictionary which is a dictionary for decompressing one or more compression target column portions within the column store database portion, and
the size of the compression dictionary in each of the plurality of data segments is equal to or smaller than the size of the first memory,
each of the one or more hardware circuits further includes a second memory slower than the first memory,
in at least one of the plurality of data segments, the size of the column store database portion is equal to or smaller than a predetermined size, and
the predetermined size
is a sum of the size of the second memory and a difference between the size of the first memory and the size of the compression dictionary, or
is the size of the second memory,
wherein the computer is configured to create the plurality of data segments by repeatedly executing:
(A) calculating, on the basis of the number of unique column values in each of one or more compression target column portions of a column store database portion that forms the m records in the column store database, the size of a compression dictionary corresponding to the column store database portion made up of m records (m is a natural number); and
(B) determining whether or not to create a data segment on the basis of a result of comparison between the calculated size and the size of the first memory.

9. A non-transitory computer-readable recording medium storing a computer program for causing a computer in a system, in which a database process among processes of a computer is offloaded to one or more hardware circuits each having a first memory, to execute:
inputting a column store database made up of a plurality of records and a plurality of columns; and
dividing the input column store database into a plurality of data segments, wherein
one or more columns among the plurality of columns are each one or more compression target columns,
each of the plurality of data segments includes
a column store database portion made up of one or more records among the plurality of records; and
a compression dictionary which is a dictionary for decompressing one or more compression target column portions within the column store database portion, and
the size of the compression dictionary in each of the plurality of data segments is equal to or smaller than the size of the first memory,
each of the one or more hardware circuits further includes a second memory slower than the first memory,
in at least one of the plurality of data segments, the size of the column store database portion is equal to or smaller than a predetermined size, and
the predetermined size
is a sum of the size of the second memory and a difference between the size of the first memory and the size of the compression dictionary, or
is the size of the second memory,
wherein the computer is configured to create the plurality of data segments by repeatedly executing:
(A) calculating, on the basis of the number of unique column values in each of one or more compression target column portions of a column store database portion that forms the m records in the column store database, the size of a compression dictionary corresponding to the column store database portion made up of m records (m is a natural number); and
(B) determining whether or not to create a data segment on the basis of a result of comparison between the calculated size and the size of the first memory.

* * * * *